Figure 1:
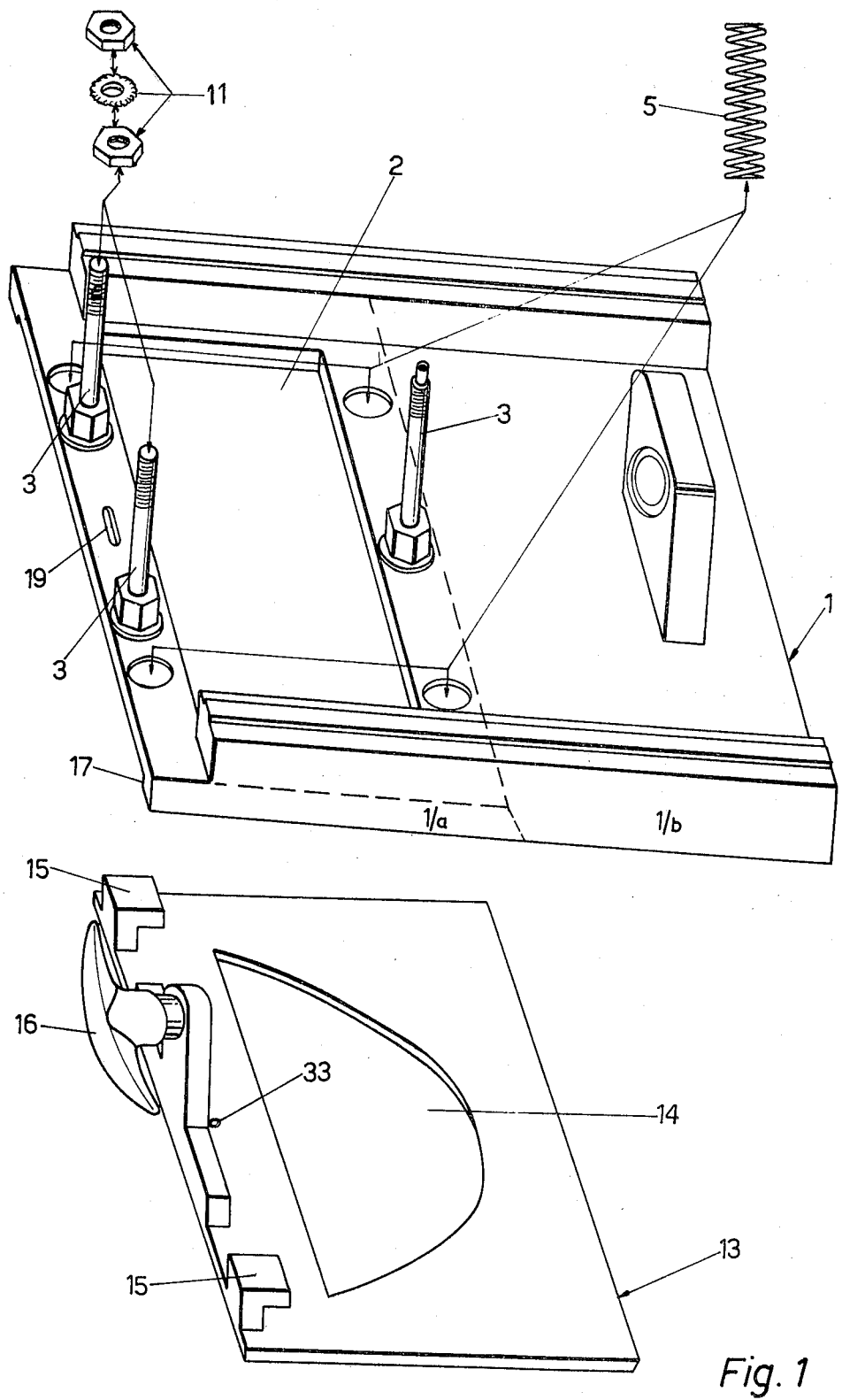

United States Patent [19]
Capuano

[11] 3,795,466
[45] Mar. 5, 1974

[54] MOLD FOR MACHINES FOR APPLYING THERMOPLASTIC BOX TOES TO SHOE UPPERS

[75] Inventor: Antonio Capuano, Vigevano, Italy

[73] Assignee: ISM Corporation, Woburn, Mass.

[22] Filed: Dec. 13, 1971

[21] Appl. No.: 207,378

[52] U.S. Cl.............. 425/117, 156/500, 156/498, 425/129, 264/244
[51] Int. Cl........................................... B29c 27/18
[58] Field of Search .... 425/117, 119, 129; 156/245, 156/498, 500

[56] References Cited
UNITED STATES PATENTS

| | | | |
|---|---|---|---|
| 3,199,149 | 8/1965 | Croyle | 425/119 |
| 3,443,279 | 5/1969 | McIlvin et al. | 425/119 |
| 3,555,609 | 1/1971 | Chu et al. | 425/119 |
| 3,173,173 | 3/1965 | Lister | 425/119 |
| 3,403,423 | 10/1968 | McMorrow et al. | 425/119 |
| 3,412,433 | 11/1968 | Ralphs et al. | 425/119 X |
| 3,481,003 | 12/1969 | Taylor et al. | 425/119 |

*Primary Examiner*—J. Howard Flint, Jr.
*Attorney, Agent, or Firm*—Amster & Rothstein

[57] ABSTRACT

A mold for use on machines for applying thermoplastic box toes to shoe uppers has a first part horizontally reciprocable to move the mold from a thermoplastic material supply station to a box toe applying station and conversely, and a second part mounted on the first part and carrying on the lower side thereof a male element provided with a downwardly open recess to receive the box toe and with a chamber above said recess to receive the cooling liquid. The first part consists in a plate provided beneath the male element of the second part with a window larger in size than the male element. The latter is clamped to the second part and is removable from the bottom through the window in the first part. The female consists in a plate provided with an opening therein and is adapted to be removed horizontally from the first part to clear the window.

10 Claims, 2 Drawing Figures

MOLD FOR MACHINES FOR APPLYING THERMOPLASTIC BOX TOES TO SHOE UPPERS

This invention relates to improvements in molding apparatus such as the type shown in U.S. Pat. No. 3,442,743 which relates to forming and applying a layer of thermoplastic material, in a predetermined shape, to a workpiece such as a shoe upper to form a box toe or the like.

The apparatus described in the above patent specification includes a supply source for molten thermoplastic material, a mold member having a mold recess formed in its face to enable the molten thermoplastic to fill the recess so that when filled, a surface of the molten thermoplastic in the recess is exposed, means for cooling the mold to solidify that portion of the thermoplastic which is in contact with the recess while leaving the exposed surface of the thermoplastic tacky, means for moving the mold horizontally toward a working station to enable subsequent vertical movement between the mold and the workpiece to press the partially cooled thermoplastic onto the workpiece and means for thereafter returning the mold to its original position in readiness to receive another charge of molten thermoplastic material.

The present invention relates to an improved structure for supporting the mold in the machine and which enables the mold to be replaced more easily, with greater convenience and with minimal down-time of the machine. The invention is particularly useful in environments where frequent mold changes are likely, as when a run of box toes are to be made with the box toes being of a number of different shapes.

Figure 2:
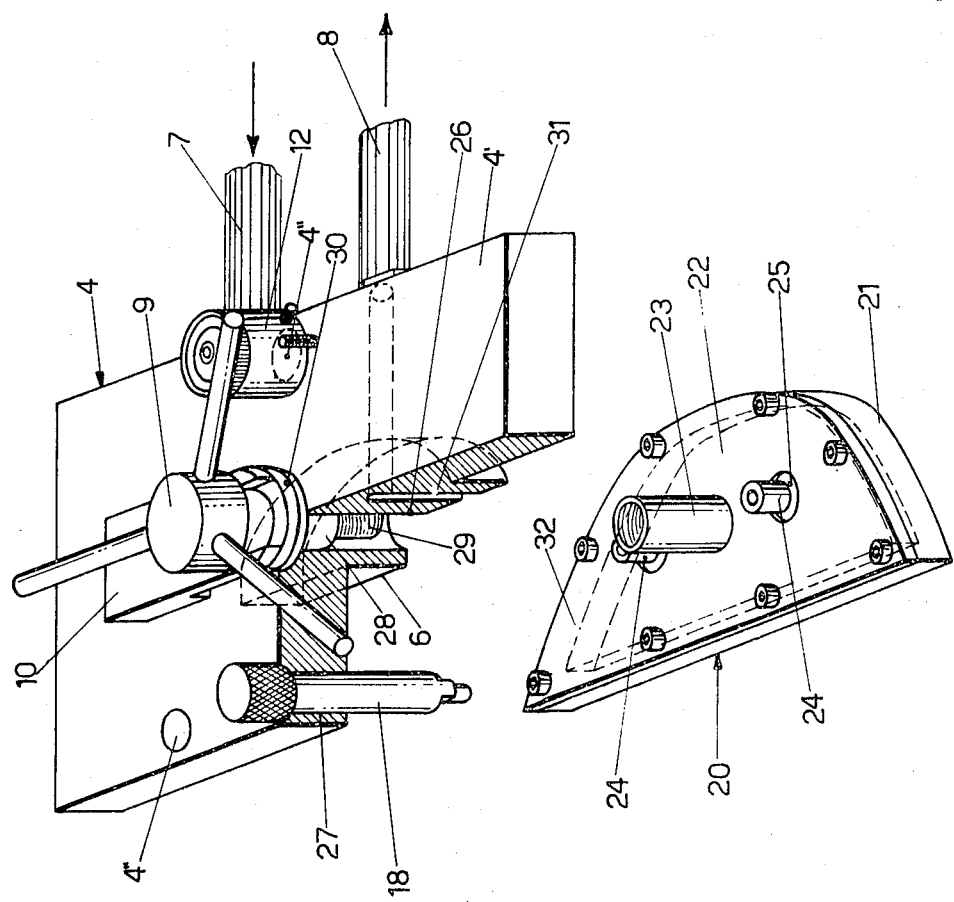

The various features and advantages of the invention will be apparent from the following description, taken together with the appended drawings wherein:

FIG. 1 is an exploded perspective view, somewhat diagrammatic, of the mold assembly which is of a horizontally slidable carriage; and FIG. 2 is an exploded perspective view, somewhat diagrammatic and broken away, of the mold assembly which is carried by the assembly shown in FIG. 1 and which is mounted to that assembly for vertical movement.

As employed herein, the term "machine" will refer to the type of machine defined in U.S. Pat. No. 3,442,743. The drawings herein show the modified mold supporting arrangement which is movable in the machine between the thermoplastic loading station and the work supporting station referred to above. When the parts shown in the drawing are fully assembled, they are movable horizontally and in a forward-rearward direction between the aforesaid stations. The parts of the machine shown in the Figures are seen somewhat from the side and it will be appreciated that in operation the assembly moves from right to left (forwardly) and from left to right (rearwardly). In the following description, "forwardly" and "rearwardly" will designate such directions.

The invention includes a carriage plate 1 which is slidably mounted to the frame of the machine for horizontal movement in a forward-rearward direction. The carriage plate 1 carries with it the other elements of the invention shown in the drawings for movement in unison therewith between the rearward loading station and the forward workpiece operating station. The forward region of the carriage plate 1 includes an enlarged rectangular opening 2. Detachably mounted to the carriage plate 1 is a wiping plate 13 having a mold aperture 14 formed therein. The mold aperture 14 is of a shape and size which is adapted to receive the mold member 20 (FIG. 2). The wiping plate 13 is mounted to and below the carriage plate 1 so that its mold aperture 14 is in alignment with the opening 2 formed in the carriage plate. The wiping plate 13 is detachably mounted to the front end of the carriage plate 1 by means of a pair of brackets 15 secured or integral with the forward end of the wiping plate which are adapted to engage the forward end of the carriage plate. The wiping plate 13 includes an aperture 33 which, when the wiping plate 13 is properly positioned, is aligned with a slot 19 formed in the forward end of the carriage plate 1. A pin 18, shown in FIG. 2, is employed in a manner described more fully below, to extend through the align slot 19 and aperture 33 to alock the wiping plate 13 firmly to the carriage plate.

The parts of the device shown in FIG. 2 are mounted to and carried by the carriage plate 1 for movement both in unison therewith in a forward-rearward direction and also for vertical movement with respect to the plate 1 when the carriage plate 1 is in its forward position. As shown in FIG. 2 the vertically movable assembly includes an upper plate assembly indicated generally by the arrow 4 which includes an upper plate 4' from which the mold member 20 depends. The upper plate assembly 4 is supported on the carriage plate 1 for vertical movement by means of three posts 3 secured to the plate 1 and extending upwardly therefrom as shown in FIG. 1. The upper plate 4' has three holes 4'' (only two of the holes 4'' can be seen in FIG. 2) similarly arranged to receive the posts 3. The upper plate 4' is retained on posts by means of nut and washer arrangements 11 (FIG. 1) which are threaded on to the upper ends of the two more forward posts 3 after the upper plate 4' has been placed and the threaded knob 12 which screws onto the upper end of the more rearward post 3. The posts 3 serve to retain the upper plate 4' in the proper alignment with the enlarged opening 2 in the carriage plate 1 and also serve to guide the upper plate assembly 4 in its vertical movement. The upper plate 4' is normally biased in its upper most position by four compression springs 5 which are retained at their lower ends in sockets formed in the upper service of the carriage plate and which bear upwardly against the underside of the upper plate 4'.

The mold member 20 is supported from the upper plate 4' for movement in unison therewith but in a manner which enables the mold member 20 to be easily detached in a manner described more fully below. The mold member 20 includes a mold plate 21 having a recess (not shown) formed at its underside which receives the molten thermoplastic cement when the device is at its rearward loading station. The upper surface of the mold plate 21 also is recessed and is covered by the cover 22 to define an enclosed coolant chamber 32. For the purposes and mode of operation set forth in the aforementioned U.S. Pat. No. 3,442,743, a fluid coolant may be circulated through the coolant chamber by means of inlet and outlet nipples 24 which are secured to the cover 22 and which provide communication to and from the coolant chamber 32. In the preferred embodiment the nipples 24 are provided with resilient seals, such as those suggested at 25 which cooperate with the mating portions of the upper plate 4' as described below. The mold member is detachably connectable to the upper plate assembly 4 by means of an internally threaded sleeve 23 which is secured to the cover 22. The sleeve 23 and nipples 24 also function to locate properly the mold member 20 with respect to the upper plate assembly 4.

The underside of the upper plate 4' includes a downwardly projecting boss 6 having a central hole formed therethrough which receives the sleeve 23. The boss 6 also includes a pair of downwardly opening conduits 31 located on opposite sides of the central hole 26 which are adapted to receive the inlet and outlet nipples 24. The conduits 31 extend through the upper plate 4' and rearwardly where they are connected to the inlet and outlet coolant conduits 7 and 8 respectively. The mold member 20 is securely retained to the underside of the boss 6 by means of a spindle 28 having a lower threaded end 29 which extends downwardly into the central hole 26. The threaded end 29 of the spindle 28 is adapted to be threaded into the sleeve 23 to draw the mold member 20, nipples 24 and seals 25 snuggly up against the bottom of the boss 6. For this purpose, the upper end of the spindle 28 includes a hand wheel 9. The hand wheel is rotatably supported by a fork 10 mounted to the top side of the upper plate 4'. An abutment disc 30 may be provided between the hand wheel 9 and the upper surface of the upper plate 4'.

When the upper plate assembly 4, mold member 20, wiping plate 13 and carriage plate 1 are assembled, the upper plate 4' is biased by the springs 5 in its upper most position as determined by engagement with the nuts and washers 11 and knob 12. The lower surface of the mold plate 21 which includes the mold recess (not shown) lies flush with the underside of the wiping plate 13, the peripheral configuration of the mold plate 21 being complimentary to and fitting closely within the mold aperture 14 in the wiping plate 13. The wiping plate 13 and carriage plate 1 are retained together by the lower end of a pin 18 which passes downwardly through the aligned slot 19 and aperture 33. The upper end of the pin 18 is slidably received within a hole 27 formed in the upper plate 4' with the pin resting on the carriage plate 1 so that the upper plate may move freely vertically without interference from the pin yet retain the pin 18 in its place.

In operation, the assembly in its foregoing configuration is moved horizontally rearwardly to the thermoplastic loading station at which the mold recess (not shown) in the underside of the mold plate 21 is filled with thermoplastic material. The hot thermoplastic material which fills the underside of the mold plate 21 begins to cool to a more solid state at the region which contacts the cooled wall 32, with the downwardly exposed portion of the thermoplastic material remaining hot and tacky. The carriage plate 1 and all of the above elements supported thereby then is moved forwardly and horizontally to a position over the station at which the workpiece is supported. During this movement, the underside of the mold plate 21 and wiping plate 13 is wiped in the manner described in the aforementioned patent. After the full assembly has been moved forwardly over the work supporting station, the upper plate assembly 4 is urged vertically downwardly to urge the thermoplastic filled recess at the bottom face of the mold plate 21 against the workpiece. The upper surface of the thermoplastic wafer which has been cooled by the coolant releases the wafer easily and the lower exposed surface of the thermoplastic wafer which is still tacky adheres to the workpiece. When the upper plate assembly 4 and mold member 20 are thereafter raised the thermoplastic wafer remains bonded to the workpiece and the carriage plate may then be returned to its rearward position to be reloaded with thermoplastic material.

The invention permits mold members to be easily and rapidly changed which is of particular importance such as, for example, in the shoe industry where it frequently is desirable to apply thermoplastic box toe wafers to various sizes, shapes and styles of shoe uppers which require similarly varying mold shapes. In order to set up the machine to accommodate a different type of mold arrangement, the operator need only move the carriage plate to its forward position and then unscrew the hand wheel 9 and lift the pin 18. This frees both the mold member 20 and the wiping plate 13. The wiping plate 13 may include a handle 16 to facilitate its removal. The reverse procedure then is followed in replacement of the mold member 20 and wiping plate 13 having the modified mold shape, etc.

From the foregoing description of the invention, its advantages should be apparent. With the foregoing arrangement it is unnecessary to replace the complete mold assembly as had been necessary previously. Only the mold member 20 and wiping plate 13 need be changed. Moreover, this may be done easily and simply which minimizes down-time. In addition, substantial financial savings can be achieved.

FIG. 1 also suggests in phantom a modification of the invention by which the carriage plate 1 can be made in two sections 1/a and 1/b which are detachably connected to each other by screws (not shown) or the like. The more forward section 1/a of the carriage plate 1 could, if desired, be detached together with the entire structure described above without disassembling that structure in anyway.

It should be understood, however, that the foregoing description of the invention is intended merely to be illustrative thereof and that other modifications and changes may occur to those skilled in the art without departing from its spirit.

I claim

1. In a machine for applying a preformed thermoplastic wafer to a workpiece, the improvement comprising:
   carriage means mounted in said machine for horizontally reciprocable movement between a thermoplastic supply station and an applying station;
   a mold member carried by the carriage and having a downwardly facing surface defining a recess in order to receive the molten thermoplastic material;
   said mold member further including an enclosed coolant chamber;
   said mold member being of a predetermined peripheral shape;
   means mounting said mold member for vertical movement relative to said carriage means to enable said mold member to be urged downwardly toward said workpiece when said carriage is at said applying station;
   wiping plate means mounted to said carriage and having a mold aperture formed therethrough of substantially the same shape as that of the periphery of said mold member, said aperture being dimensioned to receive said mold member and to enable vertical motion of said mold member through said mold aperture;

said mold member being removably supported by said carriage in a manner which, when released, enables said mold member to be withdrawn vertically downwardly through said mold aperture; and means mounting the wiping plate means to said carriage means for removal after said mold member has been withdrawn.

2. An apparatus as defined in claim 1 wherein the mold member is supported by said carriage means by means comprising:

an upper plate mounted to said carriage means for vertical movement;

said carriage means having an enlarged opening formed therein below said upper plate;

said mold member being mounted to the underside of said upper plate and in registry with the enlarged opening in the carriage means to enable said mold member to pass vertically through said enlarged opening when said upper plate is moved vertically; and the wiping plate means being mounted to and below said carriage means and having its mold aperture in registry with the mold member and with the enlarged opening of said carriage means.

3. An apparatus as defined in claim 2 wherein said carriage means comprises a carriage plate and wherein the wiping plate means is removably mounted to the carriage plate by means comprising:

bracket means secured to the wiping plate means and constructed and arranged to engage the edge of the carriage, the wiping plate means and the carriage plate having holes formed therethrough and adapted to be in alignment when the wiping plate means is properly registered with the carriage plate;

a locking pin extending downwardly through the aligned holes in said wiping plate means and said carriage plate;

the locking pin extending upwardly from said carriage plate through a receptive opening in the upper plate;

the pin being vertically removable from said aligned holes; and the hole in the upper plate which is receptive to said locking pin being arranged to permit the vertical movement of said upper plate freely with respect to the locking pin.

4. An apparatus as defined in claim 2 wherein the means for mounting the mold member to the upper plate comprises:

a spindle rotatably supported by and extending through said upper plate;

the spindle having a lower end extending below the upper plate;

the mold member having an internally threaded sleeve secured thereto and extending upwardly therefrom, the threaded sleeve being adapted to threadable receive the lower end of the spindle; and the upper end of the spindle being secured to a rotatable hand wheel.

5. An apparatus as defined in claim 2 further comprising:

the underside of the upper plate including a downwardly extending boss which surrounds the lower threaded end of the spindle;

the lower threaded end of the spindle being of a diameter substantially smaller than that of the hole extending through the boss;

the hole extending through the boss being dimensioned to receive the internally threaded upwardly extending sleeve; and the length of the boss being sufficient to enable the mold member to be drawn upwardly and firmly against the bottom of the boss.

6. An apparatus as defined in claim 4 further comprising:

the mold member including a pair of nipples located on either side of the sleeve, the nipples being in communication with the coolant chamber in the mold member;

the upper plate including a pair of receptive holes in the boss to receive the nipples, the holes in the boss being connectable to a source of fluid coolant to enable the fluid coolant to be circulated to and through the coolant chamber in the mold member; and sealing means associated with each of the nipples.

7. An apparatus as defined in claim 3 wherein the means for mounting the mold member to the upper plate comprises:

a spindle rotatably supported by and extending through said upper plate;

the spindle having a lower end extending below the upper plate;

the mold member having an internally threaded sleeve secured thereto and extending upwardly therefrom;

the threaded sleeve being adapted to threadable receive the lower end of the spindle; and the upper end of the spindle being secured to a rotatable hand wheel.

8. An apparatus as defined in claim 7 further comprising:

the underside of the upper plate including a downwardly extending boss which surrounds the lower threaded end of the spindle;

the lower threaded end of the spindle being of a diameter substantially smaller than that of the hole extending through the boss;

the hole extending through the boss being dimensioned to receive the internally threaded upwardly extending sleeve; and the length of the boss being sufficient to enable the mold member to be drawn upwardly and firmly against the bottom of the boss.

9. An apparatus as defined in claim 7 further comprising:

the mold member including a pair of nipples located on either side of the sleeve, the nipples being in communication with the coolant chamber in the mold member;

the upper plate including a pair of receptive holes in the boss to receive the nipples, the holes in the boss being connectable to a source of fluid coolant to enable the fluid coolant to be circulated to and through the coolant chamber in the mold member; and sealing means associated with each of the nipples.

10. An apparatus as defined in claim 8 further comprising:
 the mold member including a pair of nipples located on either side of the sleeve, the nipples being in communication with the coolant chamber in the mold member;
 the upper plate including a pair of receptive holes in the boss to receive the nipples, the holes in the boss being connectable to a source of fluid coolant to enable the fluid coolant to be circulated to and through the coolant chamber in the mold member; and
 sealing means associated with each of the nipples.

* * * * *